United States Patent [19]
Terry

[11] Patent Number: 5,546,131
[45] Date of Patent: Aug. 13, 1996

[54] TELEVISION RECEIVER HAVING AN ARRANGEMENT FOR VERTICALLY SHIFTING SUBTITLES

[75] Inventor: Alan J. Terry, London, England

[73] Assignee: U.S. Philips Corporation, New York, N.Y.

[21] Appl. No.: 262,727

[22] Filed: Jun. 20, 1994

[30] Foreign Application Priority Data

Jun. 18, 1993 [GB] United Kingdom .................. 9312690

[51] Int. Cl.⁶ ................................................ H04N 5/445
[52] U.S. Cl. ........................... 348/564; 348/589; 348/468
[58] Field of Search ..................................... 348/555, 561,
348/562, 563, 564, 569, 556, 570, 584,
589, 704, 468, 461; H04N 5/278, 5/272,
5/265, 5/262, 5/445, 5/46, 7/087, 7/08,
7/01

[56] References Cited

U.S. PATENT DOCUMENTS

| | | | |
|---|---|---|---|
| 5,298,995 | 3/1994 | Monta et al. | 348/458 |
| 5,467,142 | 11/1995 | Ichinokawa | 348/556 |
| 5,471,249 | 11/1995 | Monta et al. | 348/563 |
| 5,486,870 | 1/1996 | Decreamer | 348/556 |

FOREIGN PATENT DOCUMENTS

| | | | |
|---|---|---|---|
| 0546880 | 6/1993 | European Pat. Off. | H04N 5/278 |
| 0002483 | 1/1984 | Japan | 358/462 |
| 0305190 | 12/1990 | Japan | H04N 7/010 |
| 0321387 | 11/1992 | Japan | H04N 5/278 |
| 0347980 | 12/1992 | Japan | H04N 5/278 |
| 0183815 | 7/1993 | Japan | H04N 5/278 |
| 0199462 | 8/1993 | Japan | H04N 5/278 |
| 2242594 | 2/1991 | United Kingdom. | |

OTHER PUBLICATIONS

Mitsubishi brochure dated 1992.

*Primary Examiner*—David E. Harvey
*Attorney, Agent, or Firm*—Edward W. Goodman

[57] ABSTRACT

In a television receiver having a wide aspect ratio display device (for example 16:9) which is arranged to receive and display a television transmission relating to a 4:3 aspect ratio picture, the receiver may be set to expand the 4:3 aspect ratio picture to cover the whole width of the display. Where this results in subtitles which are superimposed on the picture to be lost (since the expansion causes a portion of the bottom of the picture to be undisplayed) an arrangement (28) is provided to detect the presence of subtitles and shift them to a displayed portion of the display.

11 Claims, 5 Drawing Sheets

TELEVISION RECEIVER HAVING AN ARRANGEMENT FOR VERTICALLY SHIFTING SUBTITLES

BACKGROUND OF THE INVENTION

1. Field of the Invention

The invention relates to television receivers.

Currently the majority of television programs transmitted have a nominal picture aspect ratio of 4:3, that is, the picture is four units wide and three units high. As a result, most television receivers are provided with a display screen having the same aspect ratio. However, many programs are made with a different aspect ratio, particularly feature films which were originally made for display in Cinemas. These programs are frequently broadcast in a form which has become known as "letterbox format". This results in black horizontal bars being displayed at the top and bottom of a normal 4:3 format display screen.

2. Description of the Related Art

An increasing number of television receivers are now being produced with a display screen having an aspect ratio of 16:9. This more closely matches the normal film format and reduces or, in some cases, eliminates the black bars at the top and bottom of the screen enabling the picture to occupy the full screen area. However, broadcasters often use the lower black bar to insert subtitles. If the transmitted picture is then expanded to fill a 16:9 aspect ratio display, the subtitles are lost. One solution to this problem is to raise the picture on the display to bring the subtitles back into view, but this causes loss of the top of the picture.

The FIGS. 1a–1f illustrate possible display formats on a 16:9 aspect ratio display. FIG. 1a shows the traditional 4:3 aspect ratio picture with black horizontal bars at the top and bottom of the picture just as it would appear on a normal 4:3 aspect ratio display and also blank vertical bars down each side of the picture which fill the unoccupied left and right hand areas of the 16:9 display. In this case the subtitle is shown in the lower horizontal bar. If the picture is then expanded to fill the display screen as shown in FIG. 1b then since the horizontal black bars are lost as well as the vertical bars at each side of the display, the subtitles are also lost. In order to recover the subtitles, it is possible to raise the picture, as shown in FIG. 1c, to restore the subtitle at the bottom. This will, of course, result in the top lines of the picture being lost. This option has been implemented in currently available 16:9 display format television receivers. The problem of the loss of picture content is exacerbated in the letterbox format shown in FIGS. 1d–1f where, in order to more easily accommodate more than one subtitle line, the letterbox format picture is already raised to the top of the 4:3 format display screen. That is, the broadcaster, knowing that the program will in most cases be viewed on a 4:3 aspect ratio display, transmits picture information from the first active line of the display thereby leaving a single, double height, black bar at the bottom of the display thereby allowing multi-line subtitles to be accommodated wholly within the single black bar. Under these circumstances, as can be seen in FIG. 1f, the degree of loss of picture content becomes significant, and in some instances unacceptable, particularly if the shifted display includes the whole of the black bar which potentially contains subtitles.

It is also known to take subtitles from the black bar at the bottom of the screen and to raise them to superimpose them on the picture area. Thus instead of raising the picture as shown in FIG. 1c and FIG. 1f, it is retained in the position shown in FIG. 1b or FIG. 1e but the subtitles are superimposed on the displayed picture. Television receivers having such a feature have been sold in Japan but Applicant is presently unaware as to how this has been achieved. One possible way to achieve this function is merely to add the luminance values of the lower black bar and the subtitles it contains to that of a lower horizontal section of the picture. This will make the black bar effectively transparent and give high luminance subtitle characters.

With television receivers having a 16:9 aspect ratio, a significant proportion of the program they presently receive are transmitted in a 4:3 aspect ratio form. These can be displayed with vertical black bars down each side of the display area but viewers may wish to expand the picture to fill the display screen. This inevitably means that some of the picture is lost unless the expanded picture is distorted by expanding only in the horizontal direction. Such a distortion is not believed to be acceptable and consequently, in presently available television receivers, the expansion is carried out equally in both directions and the loss of part of the picture is accepted. Normally this will be a narrow band at the top and bottom of the picture and frequently this will result in little significant loss of picture information and any such loss may be acceptable to the viewer, particularly where the viewer is given the choice as to which format to use on any particular occasion and the freedom to switch from one to the other instantaneously. Where subtitles are transmitted, however, they are likely to lie in the part of the picture which is lost and consequently will not be available to the viewer. A solution to this problem, which has been adopted in practice, is to provide a control which allows the 16:9 window to be placed anywhere on the 4:3 picture. Thus, to ensure display of the subtitles, this window can be placed at the bottom of the picture. As a result, however, the loss of information at the top of the picture becomes more noticeable, particularly in scenes with significant information content at the top of the picture.

SUMMARY OF THE INVENTION

It is an object of the invention to enable the display of subtitles which are transmitted in an active portion of a picture when said portion is not within the display area.

The invention provides a television receiver having a display screen aspect ratio wider than the aspect ratio of a transmitted picture and including means for expanding the received picture to fill the width of the display screen, said expansion taking place both horizontally and vertically and as a consequence, causing part of the received picture to be undisplayed; wherein said receiver further includes means for detecting the presence of subtitles within the undisplayed part and means for shifting any such subtitles so detected to a displayed part of the received picture.

The invention is based on the discovery that the presence of subtitles which are superimposed on picture information, rather than provided on a blank (or black) portion, can be detected despite the interfering nature of the picture content. Once the presence of these subtitles is detected, they can then be shifted to a displayed portion of the picture. This allows pictures transmitted in the 4:3 format to be expanded to fill a 16:9 format display without losing the subtitles when the lower portion of the picture, which may contain at least part of the subtitle information, is then outside the display area as a result of the picture expansion.

The subtitle present detection means may comprise means for counting the number of transitions of given signal level(s) in a television line.

The basis of such a detector is the realization that subtitles are normally either light characters on a dark background or vice versa and that there are a relatively large number of such transitions on every line occupied by a subtitle, that is, at least two and often more transitions per character.

The subtitle present detection means may comprise means for counting only those transitions which cross two signal levels, one being higher than the other.

This reduces the possibility of picture detail being detected as subtitle information by requiring a relatively large change in luminance to cause a transition to be detected. Thus, smaller changes in luminance due to picture detail and/or noise will not be detected as potential subtitle transitions. The two signal levels may be adaptive, i.e., the arrangement may include some "intelligence" which measures the change in luminance caused by "good" subtitles which have previously been detected and verified by a number of measures.

The television receiver may comprise means for determining the density of transitions over a portion of a scan line.

By detecting the transition density over a portion of the scan line, it is possible to detect short subtitles where only a relatively small number of transitions occur over a full scan line. Thus, a relatively small number of transitions could be set as an initial threshold to indicate the presence of a potential subtitle and-then a test for a high density of transitions over a part of the scan line could be performed as confirmation that a subtitle was present. If this confirmatory test is omitted, then a difficult compromise between the detection of short subtitles and the erroneous detection of picture content as subtitles may have to be made.

The television receiver may comprise means for determining the left and/or right hand edges of a subtitle and may further comprise means for determining the upper and lower scan lines of each subtitle row.

The television receiver may comprise means for constructing a box around the subtitle using the determined left and right hand edges and upper and lower scan lines.

By detecting the extent of the subtitle row(s) and constructing a box enclosing each row it is possible to insert an intermediate background against which the subtitles are legible. The box will preferably fairly closely enclose the subtitle row, so that a minimum of the picture is obscured. Alternatively, the extent of the box may be used to reduce the contrast of the picture information within the box to enable superimposed subtitle characters to become more legible.

The television receiver may comprise means for determining whether potential subtitle rows have a vertical component of movement and means for inhibiting the shifting means if such a vertical component is detected.

One of the properties of subtitles is that they are stationary but in other characteristics they may be exactly mimicked by scrolling captions (or credits) which typically move vertically up or down the display screen. Clearly vertically scrolling captions could be detected as subtitles but there would be little point in vertically shifting them since they will automatically appear as they scroll up the screen or will have already been displayed if they scroll down the screen. Additionally other subtitle mimicking characters may also have a vertical movement component, for example alphanumeric characters on moving objects in the picture. While clearly the inhibiting means could be operable in response to all movement whether or not it includes a vertical component, there is advantage in raising characters having a purely horizontal movement as some captions are displayed as horizontally scrolling characters at the bottom of the screen and hence would ideally be brought into the displayed picture area.

The television receiver may comprise means for inhibiting the shifting means if the number of transitions or transition density is above a threshold for greater than a given number of successive scan lines.

This will provide some discrimination between true subtitles and picture content having strong vertical detail, for example fences made from stakes, since this vertical detail will, in many instances, extend further than subtitle characters in the vertical direction.

The television receiver may comprise means for detecting subtitles in the displayed part of the transmitted picture and means for ensuring that a shifted subtitle does not render the subtitle in the displayed part of the picture unreadable.

The provision of these means enables multi row subtitles to be handled. Without these means shifting of the lower row(s) of subtitles might cause them to obliterate the upper subtitle row(s), either completely or partially. Clearly, the viewer would find this unacceptable.

The television receiver may comprise means for shifting the subtitle in the displayed part of the transmitted picture to enable the display of the subtitle in the undisplayed part of the transmitted signal in a position which would otherwise at least partially obscure the original displayed subtitle.

By shifting the subtitle in the displayed picture, the space to be occupied by the subtitle shifted from the undisplayed part of the picture can be vacated. This allows the subtitle from the undisplayed portion to be placed in the most convenient location or allows a constant spacing between subtitle rows to be achieved.

The television receiver may comprise means for forming a box around the subtitle shifted from the undisplayed part of the picture, the box extending to at least cover the area from which the subtitle in the displayed part has been shifted.

If the subtitle shifted from the undisplayed part of the picture is made to overlay the subtitle in the displayed part of the picture, it is desirable to ensure that the whole of the originally displayed subtitle is obscured. Otherwise confusion between the original and shifted subtitle rows could ensue. Thus, the box is made to extend to cover the longest of the original and shifted subtitles.

BRIEF DESCRIPTION OF THE DRAWINGS

The above and other features and advantages of the invention will be apparent from the following description of an embodiment of the invention, given, by way of example, with reference to the accompanying drawings, in which.

DESCRIPTION OF THE PREFERRED EMBODIMENTS

Figure 1C:
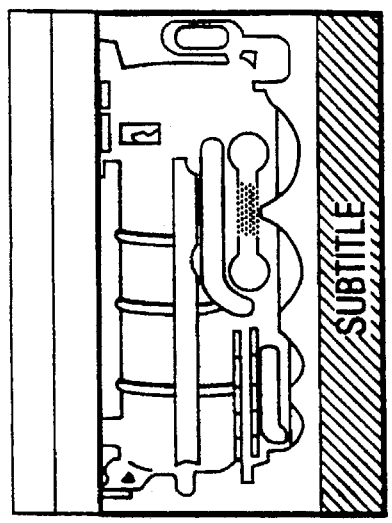
FIGS. 1a–1f illustrate various display options for displaying a 4:3 aspect ratio picture on a 16:9 aspect ratio display; device.
Figure 1F:
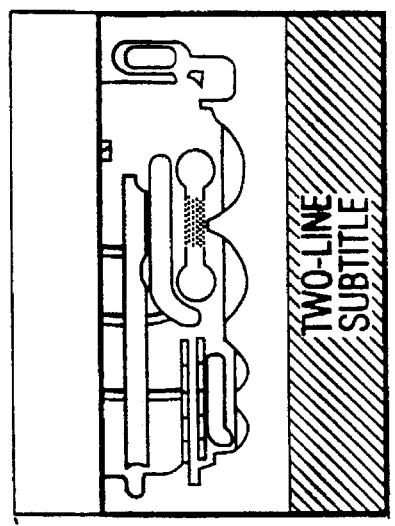
Figure 1B:
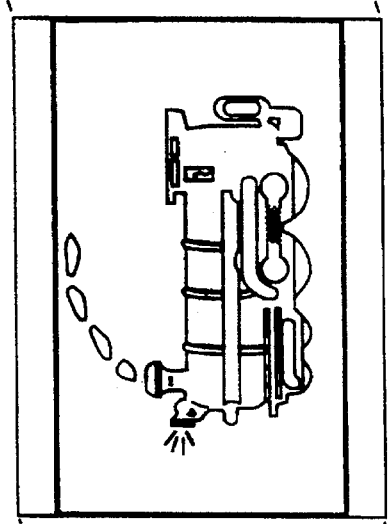
Figure 1E:
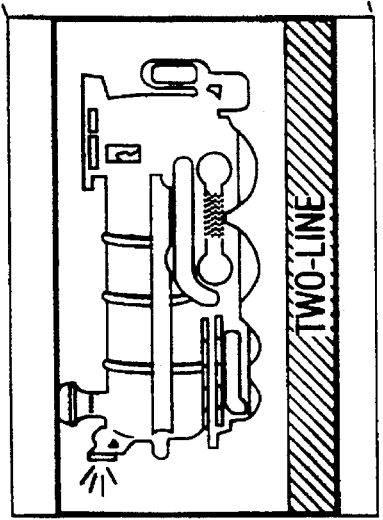
Figure 1A:
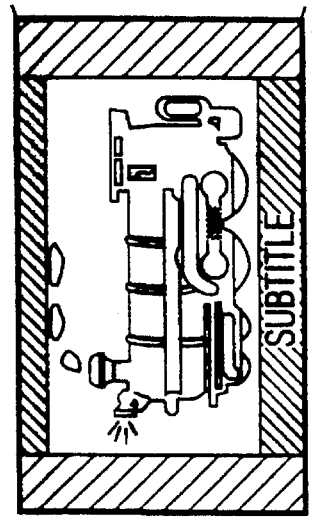
Figure 1D:
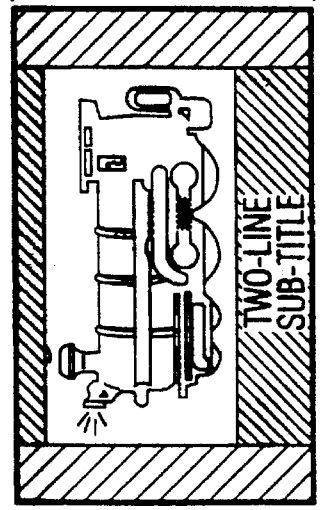
Figure 2:
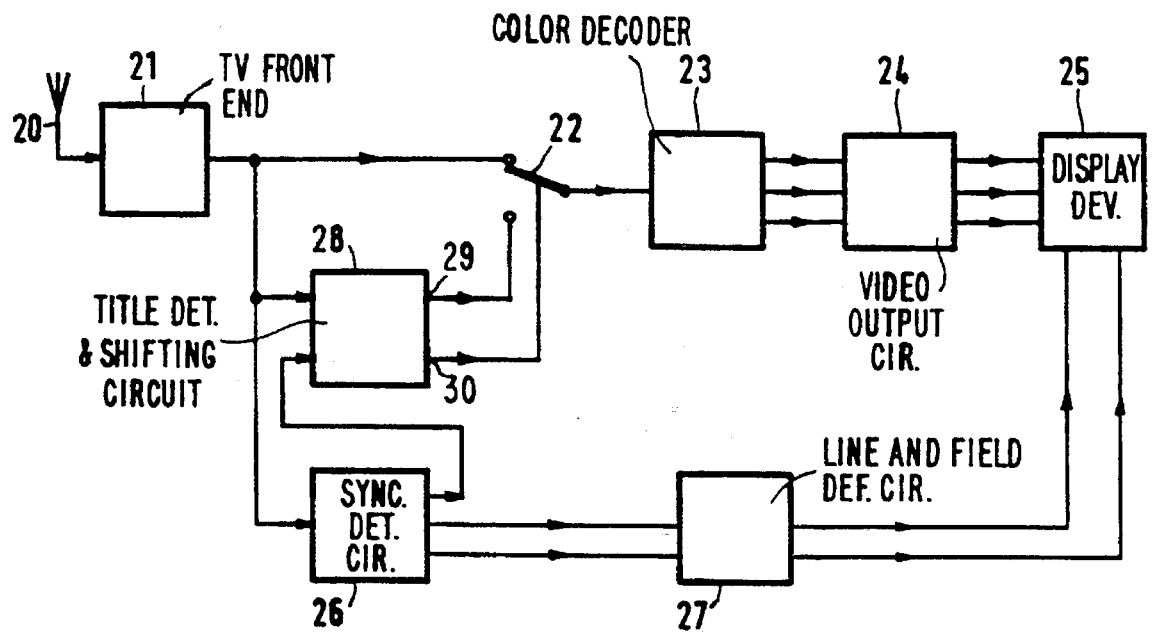
FIG. 2 is a block schematic diagram of a television receiver according to the invention.

The television receiver shown in FIG. 2 comprises an aerial 20 for receiving a transmitted television signal and coupling it to the front end 21 of the receiver, the front end comprising the usual amplifying, tuning, intermediate frequency detection and demodulation circuits. The front end 21 receives a video signal VS and produces at its output a composite video and blanking signal CVBS. The CVBS is applied to a first contact of a changeover switch 22 whose pole is connected to a color decoder 23 which produces luminances and color difference signals (YUV for the PAL system). These signals are fed to a video output circuit 24 in which they are converted into RGB signals at the appropriate levels for connection to a display device 25 which is typically a cathode ray tube. The CVBS is also fed to a synchronization detection circuit 26 which produces vertical V and horizontal H flyback pulses for application to line and field timebase and deflection circuits 27 and a composite synchronizing signal which is fed to an arrangement 28 for detecting and shifting subtitles which are superimposed on a television picture. The arrangement 28 has a first output 29 which is connected to a second contact of the switch 22 and at which the subtitles are generated at a time which corresponds to that at which the vertical scan is in an area of the picture which will be displayed on the display device 25. The arrangement 28 also has a second output 30 which is connected to a control input of the switch 22 and which is arranged to cause the switch to change state to the opposite of that shown in FIG. 2 when a subtitle is to be inserted into the picture.

Figure 3:
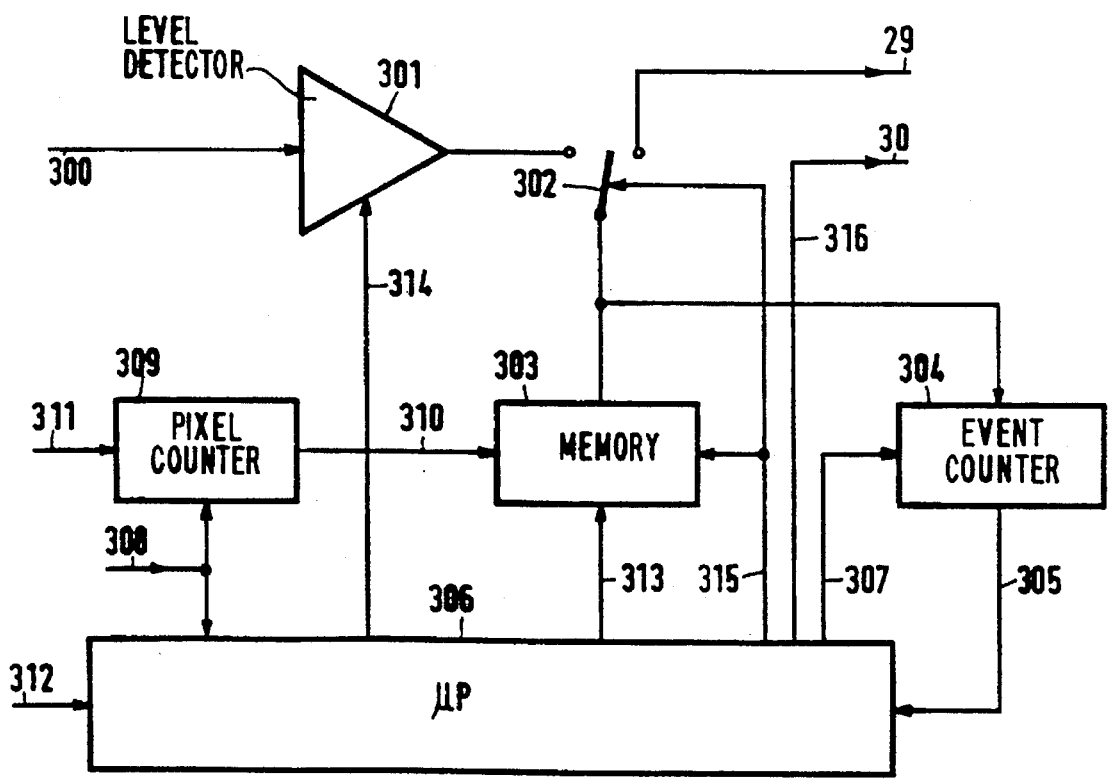
FIG. 3 is a block schematic diagram of an arrangement for detecting and shifting subtitles for use in the television receiver shown in FIG. 2.

FIG. 3 shows, in block schematic form, an embodiment of the arrangement 28 for detecting subtitles in a television picture and shifting them from an undisplayed portion of the picture to a displayed portion of the picture. As shown in FIG. 3, the arrangement has an input 300 which, in operation, receives the CVBS from the front end 21. The input 300 is connected to the input of a level detector 301 whose output is connected to a first contact of a changeover switch 302. The pole of switch 302 is connected to a memory (RAM) 303 and to an event counter 304. The event counter 304 is arranged to be incremented each time the output of the level detector 301 changes state, and consequently, counts each level transition of the input CVBS. The output count of the event counter 304 is fed over a path 305 to a microprocessor 306 which produces, at the appropriate time, a reset pulse over a line 307 to reset the event counter 304.

A pixel rate clock is applied at an input 308 and is fed to the microprocessor 306 and to a pixel counter 309. The pixel counter 309 produces an output which is fed over a path 310 to address inputs of the RAM 303. A reset pulse which is produced by the synchronization detection circuit 26, is applied to the counter 309 via an input 311 and causes the pixel counter 309 to be reset at the beginning of each horizontal line. The composite synchronizing signal, produced by the synchronization detection circuit 26, is fed to the microprocessor 306 via an input 312. The microprocessor 306 provides address information to the RAM 303 over a path 313, a control signal to the level detector 301 over a line 314, a control signal for the switch 302 and a read/write control signal for the RAM 303 over a path 315, and a signal at output 30 to control the switch 22 (FIG. 1) over a line 316. The output 29 is connected to the other contact of the changeover switch 302.

In broad terms, the arrangement shown in FIG. 3 performs the following functions:

1) recognizing whether the picture includes one or more subtitle rows, and if so,
2) identifying the boundary region(s) of the subtitle row(s),
3) storing the subtitle character pattern in memory,
4) modifying the stored data or the new overlaid picture area so that the subtitle characters are legible when shifted, and
5) displaying the stored subtitle character data at an appropriate time in a subsequent (the next) picture field(s).

The first function is achieved using the level detector 301 with the switch 302 connecting the output of the level detector 301 to the RAM 303 and event counter 304. The event counter 304 is reset by the microprocessor 306 at the start of each line and as a result will count the number of transitions of a given level as detected by the level detector 301 in the course of a television line. The number of transitions counted gives an indication as to whether subtitles exist on a given line. The level detector 301 preferably gives an output only when the signal passes through two levels, which may be adaptively set by means of the microprocessor 306 over line 314, to avoid multiple transitions being caused by noise or small fluctuations of the signal level due to picture detail (or texture). The microprocessor 306 is arranged to flag the presence of subtitles on a television line if more than a preset number of transitions are counted. In a refinement of the arrangement, the number of transitions over a limited length of a line may be monitored to enable short subtitles, which have a small total number of transitions over a full line but which have a high density of transitions over a small portion of a line, to be detected. Alternatively, the number of counts required to give a candidate subtitle may be preset to a low value and a second test carried out to determine whether, over a limited portion of a line, the density of transitions is within given limits.

The output of the level detector 301 is also connected to the RAM 303 where it is stored for each displayed pixel. This is achieved using address inputs from the microprocessor 313 which provides the "high" or more significant bits of the address and the pixel counter 309 whose output defines the "low" or least significant portion of the address. In this way, the RAM 303 is organized as an analogue of the display screen with the "high" addresses corresponding to the vertical position (or line number) on the display and the "low" address corresponding to the horizontal position along a line. Consequently the RAM 303 can store, for each pixel, information denoting whether the level detector has detected a high or low level. Clearly, if the subtitles are transmitted as light characters on a dark background, then a high detected level will represent part of a subtitle character, and conversely, if the subtitles are transmitted as dark characters on a light background a low detected level will represent part of a subtitle character.

The counting of the transitions may take place either in "real-time" as the signal is being received or later, using data stored in the RAM 303. In the latter case the switch 302 would have three states, so that the data output of the RAM 303 would be connected solely to the event counter 304 when the transitions are being counted. The former has the advantage that the results are available as early as possible, while with the latter, the processing can take place at a time and speed convenient to the microprocessor and can use the same data more than once. It may be advantageous to use a combination of both methods and to obtain the transition counts across all or most of each line in real time and then to derive the horizontal positional information relating to the detected subtitles by replaying the appropriate stored video data.

The key factor in detecting the presence of subtitles lies is in the recognition that a group of scanning lines which pass through and constitute a subtitle row will contain a number of rapid transitions between lighter and darker luminance values represented by relatively widely separated video signal levels. Thus, by counting the number of transitions in each line in the lower part of the picture area, an indication of whether a subtitle row is present or not can be obtained, a high count giving the indication that a subtitle is present.

A number of additional characteristics of subtitles can also be taken into account. The size of the characters used for subtitling has a limited range so that approximate limits can be applied to the number of adjacent scan lines which are expected to have a large number of transitions, or at least a higher number than their neighbors. These limits can be refined if a "good" subtitle, i.e., a relatively high number of transitions against a relatively unchanging background, has been recently detected. Subtitle character size and style are unlikely to be changed during a given program transmission. Similarly, multiple row subtitles will generally have consistent row spacing and character size and style. Consequently, these factors may be taken into account as auxiliary checks to confirm the presence of a subtitle row or distinguish between a true subtitle row and picture content which may mimic subtitle rows, for example, high vertical detail objects such as staking. A further feature which can be used to distinguish between subtitles and captions is that subtitles tend to appear and disappear entirely between two adjacent television fields unlike captions which tend to be faded in and out and picture content which generally just moves slowly between picture cuts. Therefore, by comparing the number of transitions in corresponding lines of adjacent fields or frames, a further distinction between the presence of subtitles and other picture information can be obtained. An additional feature of subtitles is that they are ordinarily stationary over the period in which they are being displayed, that is, each individual subtitle appears at a given position on the display and stays in that position until it disappears. This factor can be used to distinguish between subtitles and scrolling captions. Thus, although a caption may be indistinguishable from a subtitle, i.e., they are both alphanumeric characters, if the captions are being vertically scrolled there is no point in raising them into the displayed picture area since they will automatically become visible by means of the scrolling action. Ideally, of course, stationary or horizontally scrolling captions which fall outside the displayed picture area should be brought into the displayed area in the same way as subtitles. Consequently, in an enhancement of the system, the detection is merely of vertically moving captions so that horizontally scrolling captions will be raised in the same way as subtitles so that they appear in the displayed picture area.

Once it has been determined whether the picture includes one or more subtitle row(s), it is desirable to identify the boundary regions of each subtitle row detected. There are various ways of displaying subtitles. They may be displayed in a boundary of constant luminance, for example, light characters on a black background. In addition where programs include subtitles occupying more than one row, it may be that one of the subtitle rows, the highest row, is within the displayed portion of the picture. It would be of little use to raise the position of the lower subtitle rows and cover the top subtitle row. Therefore, it is necessary to determine the position of all the subtitle rows transmitted. It may then be necessary to raise the position of the subtitles which would normally occur within the picture display area. Additionally, when raising the position of subtitle rows, it is necessary that if they cover a pre-existing subtitle row, that the boundary of the subtitle row is made as large as that of the pre-existing subtitle row since otherwise, a mixture of the raised and non-raised subtitle rows will be displayed. In addition, the identification of the boundary regions of the subtitle rows helps in confirming the existence of the rows since it can be determined that, over a relatively small length of each scan line, there are a number of transitions giving a high transition density even though the total number of transitions over the row is relatively small. This helps to identify very short subtitles such as the word "no".

The subtitle character pattern is stored in memory and the stored data, or the new overlaid picture area, is modified so that the subtitle characters are legible when shifted, and then the stored subtitle character data is displayed at an appropriate time in the subsequent picture fields.

Figure 4:
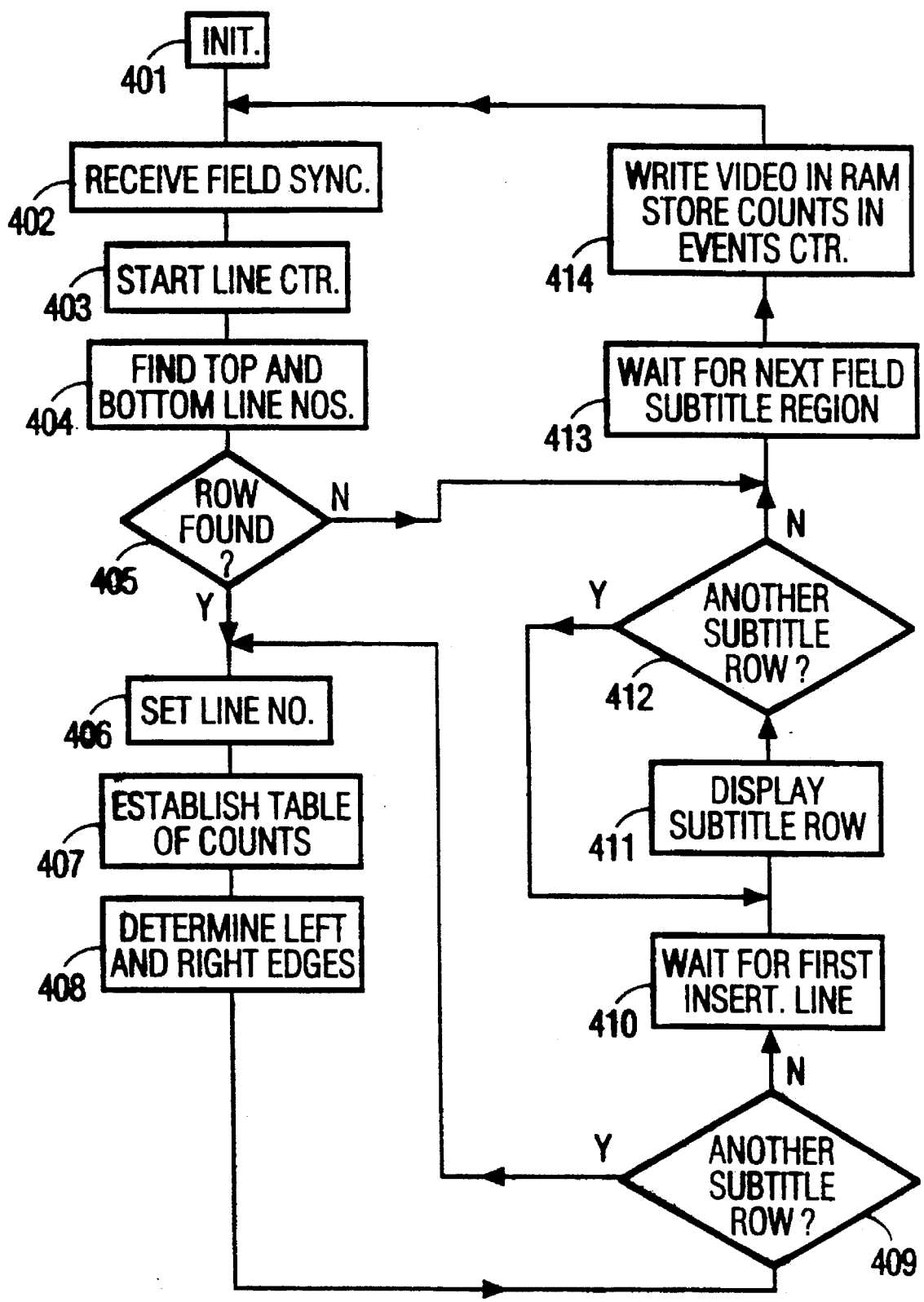
FIGS. 4, 5, and 6 are flow diagrams illustrating the operation of the arrangement shown in FIG. 3.
Figure 5:
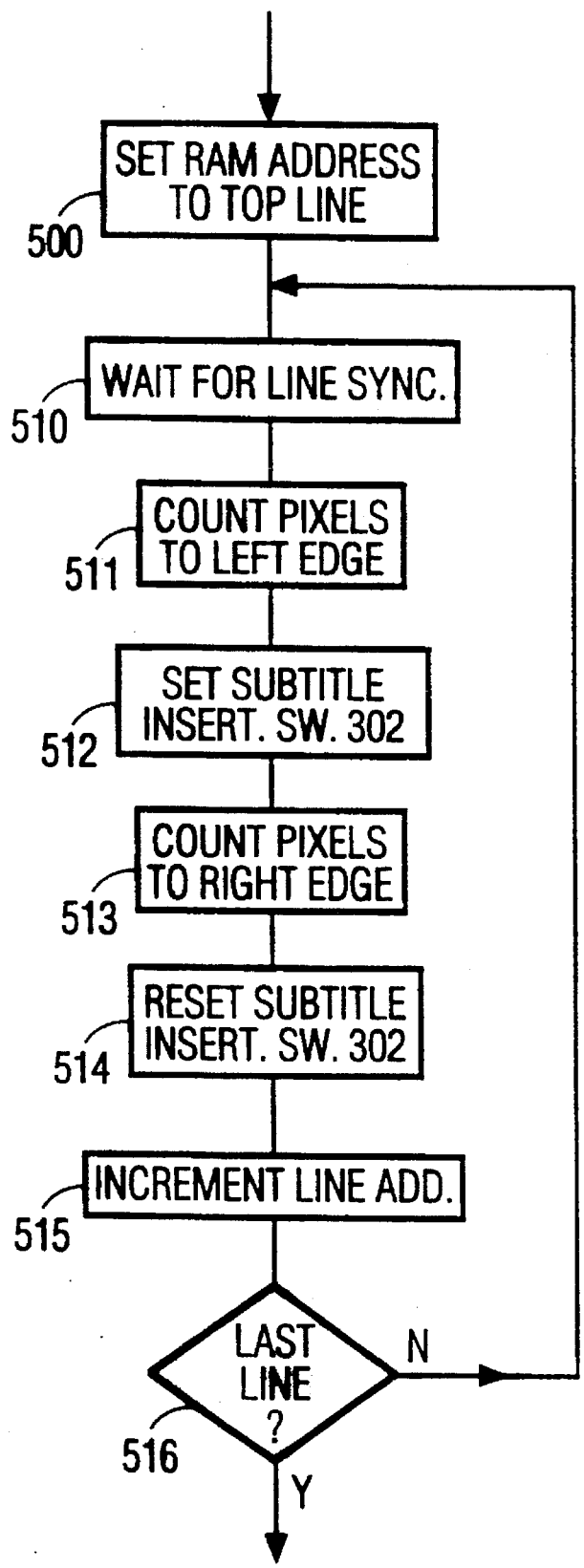
Figure 6:
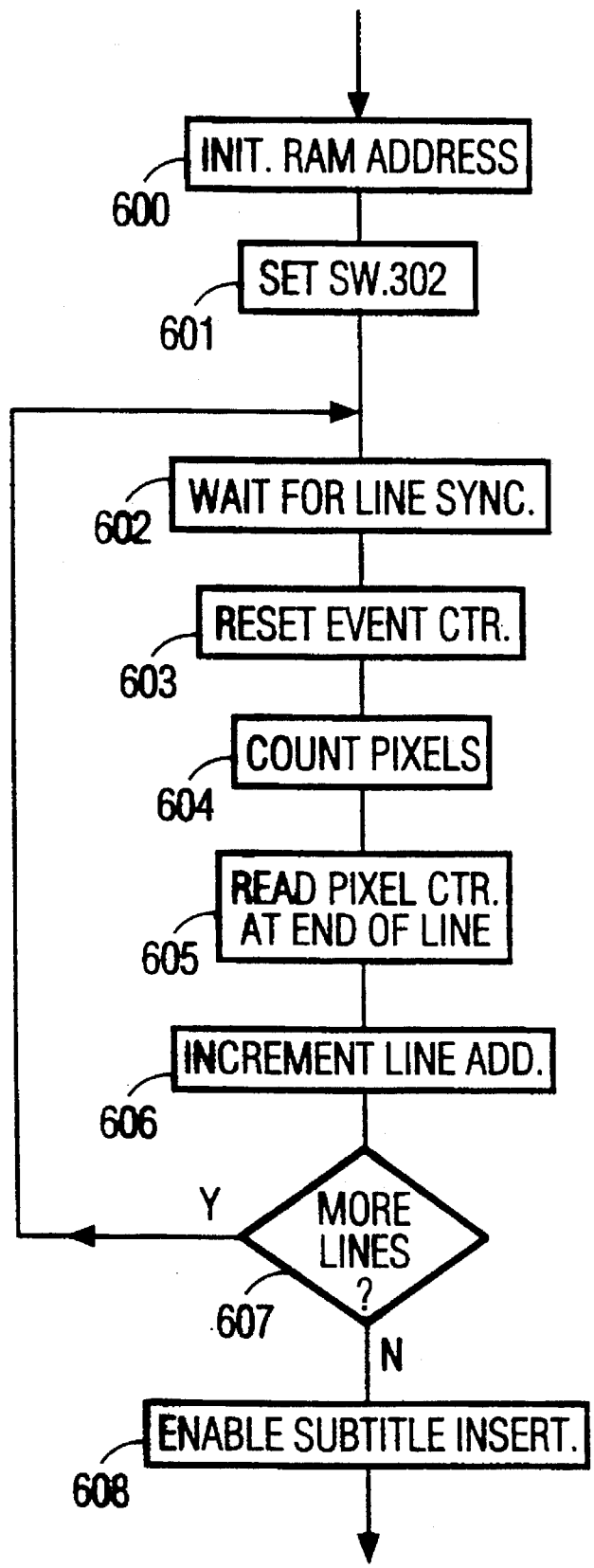

FIGS. 4, 5 and 6 are flow diagrams illustrating the process of detecting and shifting the subtitles. The process starts with an initialization step (Box 401) in which the arrangement 28 is set to an initial state where it waits for the next field synchronizing pulse (Box 402). The next step is to start the line counter (Box 403). This process causes the microprocessor to count line synchronizing pulses and to output addresses to the RAM 303 over line 313 and also to reset the event counter 304 over the line 307. The switch 302 is at this stage set to connect the output of the level detector 301 to the event counter 304 and to the RAM 303, the switch 302 being controlled over the path 315 by the microprocessor 306. The next step (Box 404) is to find the top and bottom line numbers of the subtitle rows. This process is carried out by detecting the number of counts in the event counter for each line, that is, the event counter 304 counts the number of transitions detected by the level detector 301 and if this exceeds a preset number this is taken as an indication that a subtitle row is present. The next step (Box 405) is to take a decision as to whether or not a row has been found. This decision is taken on the basis of the number of transitions found on a line and on the number of consecutive lines having more than the preset number of transitions. That is there is, a minimum subtitle height (number of scan lines) and a maximum subtitle height. Thus a comparable number of transitions should take place on each line of subtitle characters. Clearly, some degree of intelligence could be incorporated such that when subtitle characters are transmitted over a first period, a check of character size is made, and once the size has been determined, the number of scan lines allocated to a subtitle character can be given comparatively narrow limits thus minimizing the possibility of picture content mimicking subtitle characters. If it is decided that a subtitle row has been found, then the next step (Box 406) is to set the line number for the center of the subtitle row. A table of counts is then built across the subtitle row (Box 407) and from this table of counts the left and right hand edges of the subtitle row are found (Box 408). A further decision (Box 409) is taken as to whether another subtitle row exists and if so the procedure from the setting of the line number (Box 406) is repeated.

If the decision (Box 409) is "no" then this indicates that all the subtitle rows have been detected and stored and their left and right hand edges have been found. Thus the subtitles are ready for display in the next field. The next step is therefore to wait for the first insertion line (Box 410). This means that the line counter in the microprocessor 312 is monitored to count the number of lines down the displayed picture. Once the line number where the subtitles are to start has been reached, then the shifted subtitle row is displayed (Box 411).

The procedure for displaying the shifted subtitle row is expanded in FIG. 5. The first step in displaying the shifted subtitle row is to set the RAM 303 address to the top line of the subtitle (Box 500). The next step (Box 510) is to wait for the line synchronization pulse. This resets the pixel counter 309. The next step (Box 511) is to count the number of pixels from the start of the scan line to the left hand edge of the box containing the subtitle row. This number has been previously obtained in the step illustrated by Box 408. Once this has been achieved, the subtitle insert switch 302 is changed over to cause data from the RAM 303 to be fed to the output 29. This step is illustrated as Box 512. The pixel counter 309 continues counting until the position of the right hand edge of the subtitle box is reached (Box 513). Once the right hand edge of the box has been reached, the subtitle insert switch 302 is restored to its original condition or at least operated to disconnect the RAM 303 output from the output 29. This is illustrated as Box 514. The next step (Box 515), is to increment the line address and to then take a decision (Box 516) as to whether this was the last line of the subtitle row. If this is not the case, then the process loops back to wait for the line synchronization pulse (Box 510) and the process is repeated for each line making up the subtitle row. If it is determined that this was the last line of the subtitle row, then a further decision is taken (Box 412) as to whether there is another row of subtitles to be displayed. If the decision is that there is another row of subtitles to be displayed, then the process loops back to the beginning of the FIG. 5 procedure at Box 500.

If there are no further rows of subtitles to be displayed, then the procedure goes to Box 413 where the microprocessor is programmed to wait for the start of the subtitle source region in the next field (Box 413). It is known that subtitles are located in the lower portion of the picture and it is therefore only worth looking for subtitles once those particular lines are being received, this is the meaning of subtitle source region. Once that stage has been reached, the next step (Box 414) is to record the incoming video signal into the RAM 303 and store the event counts counted by the event counter 304 for each line.

The procedure illustrated by Box 414 is shown in greater detail in FIG. 6. The first step in recording the incoming video is to set the RAM 303 address to an initial state (Box 600). The switch 302 is then set by means of the microprocessor 306 over control path 315 to connect the output of the level detector 301 to the RAM 303 and event counter 304. This is illustrated by Box 601 which is a procedure which sets the hardware to a state in which the incoming signal may be analyzed and stored. The next stage is to wait for the next line synchronization pulse (Box 602). When this is detected, the event counter 304 is reset by the microprocessor over line 307. This is illustrated by Box 603. The line synchronization pulse will also cause the pixel counter 309 to be reset. Consequently the pixel counter 309 will count pixels across the display scan line (Box 604). The output of the pixel counter 310 provides addresses for the RAM 303 which is arranged as an analogue of part of the display screen. The pixel counter provides the column addresses while the microprocessor 306 provided the row addresses over the path 313. The microprocessor 306 may also count pixels across the display scan line and thus select a portion of the display scan line if required. When the end of the displayed portion of the scan line occurs, the count in the counter 304 is read (Box 605) and the value of the count is stored in a table within the microprocessor or in external memory. The next step (Box 606) is to increment the line address of the RAM 303 and then a decision (Box 607) is taken as to whether there are any more lines left to record. If there are then the process loops back to box 602. If there are no more lines to record, then the hardware is set (Box 608) to enable the insertion of the subtitles into the picture on a subsequent field. This is achieved via the procedure starting with Box 402 in FIG. 4.

As described in the Flowcharts of FIGS. 4 to 6, the procedure for analyzing whether or not subtitles exist will use the counter values stored in the process illustrated by Box 605. Thus, for example, it may be decided by the microprocessor that a line contains subtitle information if the count stored in the table for a particular line exceeds a predetermined value. As previously stated, this can cause some problems with short subtitles since over a full line, there will be comparatively few transitions but over a very short section of the line there will be a high density of transitions. Consequently, if the predetermined value is set to too high a number, it will be possible to miss short subtitles, whereas if the value is to one which will detect short subtitles, other picture content may mimic a subtitle, for example, a short subtitle such as the word "no" may have only a few transitions from dark to light or vice versa and there may in a picture scene be a comparable of transitions but spread over the whole line. It is possible, however, to distinguish between these two cases since the positions of the transitions can be read from the RAM 303 and by cycling through pixel by pixel and determining the event counts in real time, the transition density can be detected over a short section of a line. If such a high transition density is detected then it can be seen that a short subtitle is present. This function could be included in process 408 where the left and right hand edges of a subtitle row are detected. Thus it would be possible to insert a procedure where the length of a subtitle row is divided by the number of transitions and if this result is above a predetermined threshold, then that is an indication that a true subtitle row has been detected. The easiest way to locate the left hand edge of a subtitle row is, of course, to define it as the first transition along a line, and similarly, the right hand edge can be defined as the last transition along a line. This can be refined by imposing some limit on the distance between successive transitions for them to count as part of a subtitle. In that way, an isolated transition in picture content will not cause the detection of an edge of a subtitle row.

As mentioned earlier, certain other tests can be used to determine whether what is apparently a subtitle row is in fact a true subtitle row. Thus limits can be set on the vertical extent of a subtitle. In other words, a number of successive scan line containing a high number of transitions can be counted and if this extends over an unreasonable vertical distance, it can be deduced that what is being detected is picture content, for example vertical stripes on an object, rather than a subtitle row. Similarly, it is known that subtitles are stationary on the picture and potential subtitle rows can be compared from one field to the next to determine whether or not they are moving. This will help to reduce the possibility of, for example, car number plates which are part of a picture scene from being considered as a subtitle since motion of the car will cause the number plate alphanumeric characters to move across the picture scene from field to field. There may of course be instances where a car is stationary but in order for a number plate to be mistaken for a subtitle row the size of the characters needs to be the same as the typical subtitle if limits are set for subtitle character vertical extent as described above. A further distinction which may be made between picture content and subtitles is that subtitles normally appear and disappear instantaneously whereas picture content is frequently faded in and faded out, therefore a comparison between successive fields can give some indication as to whether a sudden appearance of character data has occurred. This would need an adaptive setting of the thresholds in the level detector 301.

The motion of character data can be determined in the vertical direction only so that only moving characters having a vertical component motion are ignored. In this way horizontal captions will be displayed displaced vertically on the screen. These captions are, for example, those occurring at the end of a program giving program credits which are sometimes horizontally scrolled rather than vertically scrolled. The vertically scrolled credits do not of course need to be shifted since their scrolling action will take them within the displayed picture, whereas the horizontally scrolled credits need to be vertically shifted as otherwise they would never appear within the picture frame.

From reading the present disclosure, other modifications will be apparent to persons skilled in the art. Such modifications may involve other features which are already known in the design, manufacture and use of television receivers and devices and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly, whether or not it relates to the same invention as presently claimed in any claim and whether or not it mitigates any or all of the same technical problems as does the present invention. The Applicants hereby give notice that new claims may be formulated to such features and/or combinations of such features during the prosecution of the present application or of any further application derived therefrom.

I claim:

1. A television receiver having a display screen aspect ratio wider than the aspect ratio of a received picture and including means for expanding the received picture to fill the width of the display screen, said expansion taking place both horizontally and vertically and as a consequence causing part of the received picture to be undisplayed; wherein said receiver further includes means for detecting the presence of subtitles, comprising at least one row of characters, within the undisplayed part and means for shifting said subtitles so detected to a displayed part of the received picture, wherein said received picture includes television scan lines, and in which said subtitle detection means comprises:

means for detecting each time a signal level of the received picture in one of said television scan lines passes predetermined signal levels; and means for counting the number of transitions of given signal levels in said television scan line detected by said detecting means.

2. A television receiver as claimed in claim 1, wherein said predetermined signal levels comprise two predetermined signal levels, one being higher than the other, and said means for detecting only detects when said signal level in said received picture crosses both of said predetermined signal levels.

3. A television receiver as claimed in claim 1, comprising means for determining a density of the crossings of the predetermined signal levels over a portion of a scan line.

4. A television receiver as claimed in claim 1, comprising means for determining locations of left and/or right edges of a subtitle.

5. A television receiver as claimed in claim 1, wherein each subtitle row comprises a plurality of television scan lines in the received picture, and wherein said television receiver further comprises means for determining the upper and lower scan lines of each subtitle row.

6. A television receiver as claimed in claim 5, wherein said television receiver includes means for determining locations, in the television scan lines of the received picture, of left and right edges of a subtitle, characterized in that said television receiver further comprises means for constructing a box around the subtitle using the determined locations of the left and right edges and the upper and lower scan lines.

7. A television receiver having a display screen aspect ratio wider than the aspect ratio of a received picture and including means for expanding the received picture to fill the width of the display screen, said expansion taking place both horizontally and vertically and as a consequence causing part of the received picture to be undisplayed; wherein said receiver further includes means for detecting the presence of subtitles, comprising at least one row of characters, within the undisplayed part and means for shifting said subtitles so detected to a displayed part of the received picture, wherein said received picture includes television scan lines, and each subtitle row comprises a plurality of television scan lines in the received picture, said television receiver further comprising means for detecting whether said subtitle rows have a vertical component of movement indicating that said subtitle rows are being vertically scrolled, and means for inhibiting the operation of said shifting means if said vertical component of movement is detected.

8. A television receiver as claimed in claim 3, wherein said television receiver further comprises means for inhibiting the operation of said shifting means if the number of crossings of said predetermined signal levels or the density of the crossings is above a threshold for greater than a given number of successive television scan lines.

9. A television receiver having a display screen aspect ratio wider than the aspect ratio of a received picture and including means for expanding the received picture to fill the width of the display screen, said expansion taking place both horizontally and vertically and as a consequence causing part of the received picture to be undisplayed; wherein said receiver further includes means for detecting the presence of subtitles, comprising at least one row of characters, within the undisplayed part and means for shifting said subtitles so detected to a displayed part of the received picture, wherein said received picture includes television scan lines, and each subtitle row comprises a plurality of television scan lines in the received picture, said television receiver further comprising means for detecting subtitles in the displayed part of the transmitted picture and means for ensuring that a shifted subtitle does not render the subtitles in the displayed part of the picture unreadable.

10. A television receiver as claimed in claim 9, wherein said television receiver further comprises means for shifting the subtitles in the displayed part of the transmitted picture to enable the display of the subtitle in the undisplayed part of the transmitted signal in a position which would otherwise at least partially obscure the original displayed subtitles.

11. A television receiver as claimed in claim 10, wherein said television receiver further comprises means for forming a box around the subtitle shifted from the undisplayed part of the picture, the box extending to at least cover the area from which the subtitle in the displayed part has been shifted.

* * * * *